Feb. 22, 1955 J. L. WHEELER 2,702,879

RECTIFIER NETWORK

Filed May 21, 1951 3 Sheets-Sheet 1

INVENTOR.
JOHN L. WHEELER
BY J. L. Bowes
ATTORNEY

Feb. 22, 1955 J. L. WHEELER 2,702,879

RECTIFIER NETWORK

Filed May 21, 1951 3 Sheets-Sheet 2

INVENTOR.
JOHN L. WHEELER

BY T. L. Bowes

ATTORNEY

Feb. 22, 1955 J. L. WHEELER 2,702,879

RECTIFIER NETWORK

Filed May 21, 1951

3 Sheets-Sheet 3

INVENTOR.
JOHN L. WHEELER

BY *J. L. Bowes*

ATTORNEY

United States Patent Office 2,702,879

Patented Feb. 22, 1955

2,702,879

RECTIFIER NETWORK

John L. Wheeler, Rochester, N. Y., assignor to Stromberg-Carlson Company, a corporation of New York Application May 21, 1951, Serial No. 227,489

6 Claims. (Cl. 321—8)

This invention relates to rectifier network assemblies and more particularly to the structural features of a new and improved network of this type.

Rectifier networks comprising a plurality of rectifiers such as crystal diodes or rectifiers have been proposed for many uses, as, for example, as multi-position switches for use in electronic computers, or as commutators to distribute signals. Such networks are useful wherever rapid multi-position switching is useful.

Rectifier networks of this type usually comprise two sets of terminals interconnected by suitable conductors and rectifiers arranged in a desired pattern. One set, the input set, may be actuated by switches, electron discharge tubes, relays, and the like. The other or output set may actuate tubes or relays for example. In this connection, reference to a paper entitled "Rectifier Networks for Multi-position Switching" by D. R. Brown and N. Rochester appearing in the February, 1949 issue of the Proceedings of the Institute of Radio Engineers may be helpful. In this paper, several different types of circuits using rectifier networks are discussed.

It is an object of my invention to provide a rectifier network whereby the rectifiers or crystal diodes employed in a matrix or network can be easily inserted and removed.

A further object of my present invention is to provide a new and improved electrical component network assembly of the plug-in type.

A further object of this invention is to provide a new and improved rectifier network assembly which enables simple testing of individual diodes.

In accordance with the principles of my invention, there is provided in a preferred embodiment thereof a pair of spaced-apart terminal strips carrying a suitable number of clips or other mounts on the outer surfaces of the strips for removable frictional engagement with the terminals of suitable rectifiers such as crystal diode rectifiers, thereby enabling the easy insertion and removal of the individual rectifier elements. The interconnecting wiring is contained between the strips or panels. The assembly is carried on a plug-in mount, the plug terminals being wired into the network at suitable points.

Figure 1:
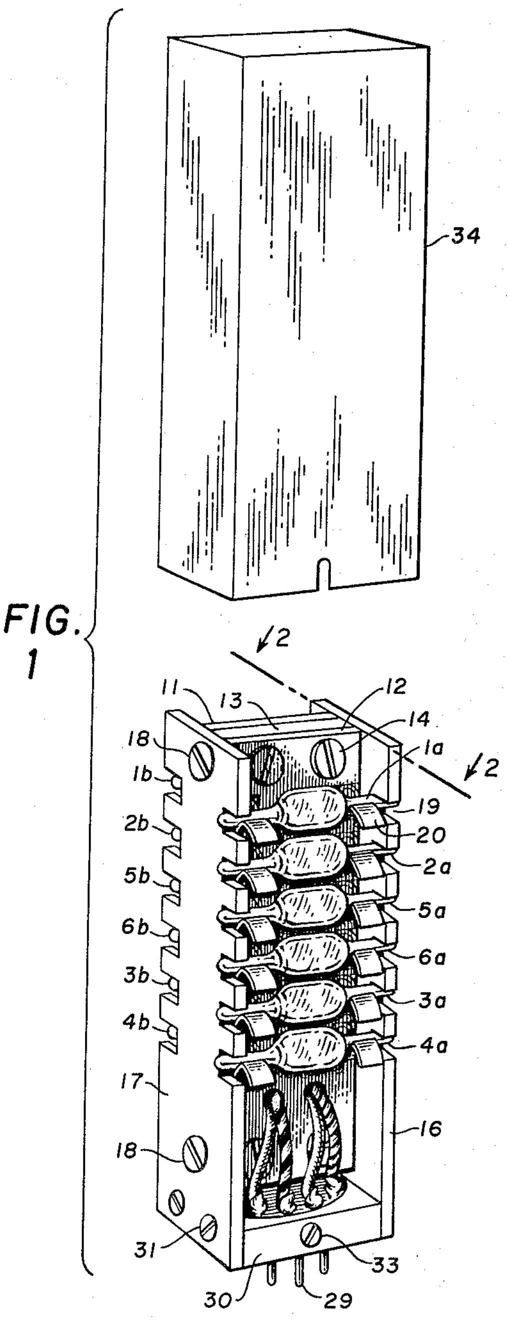
Figure 2:
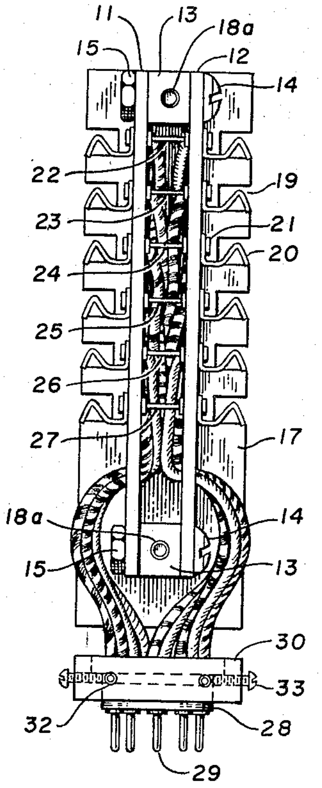
Figure 3:
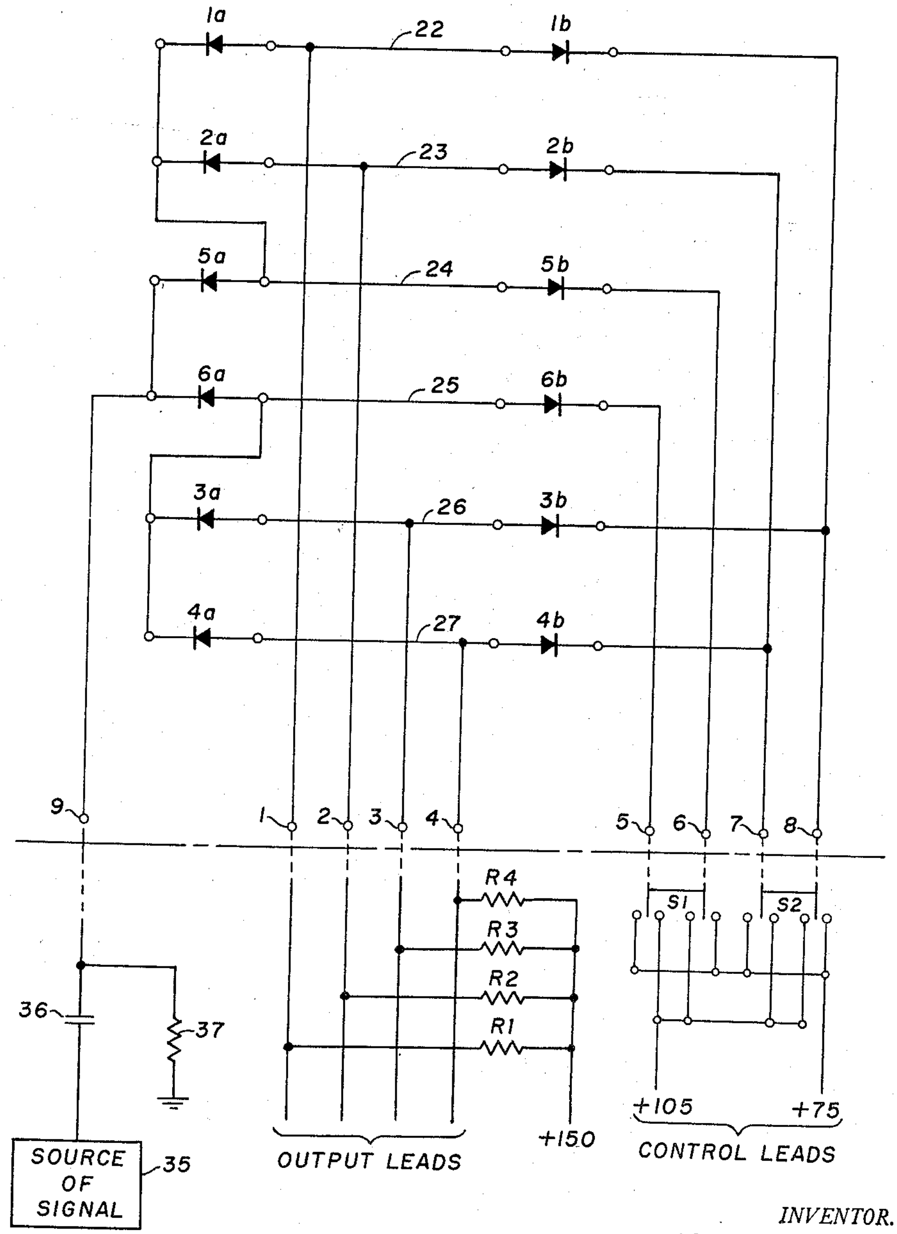
Figure 4:
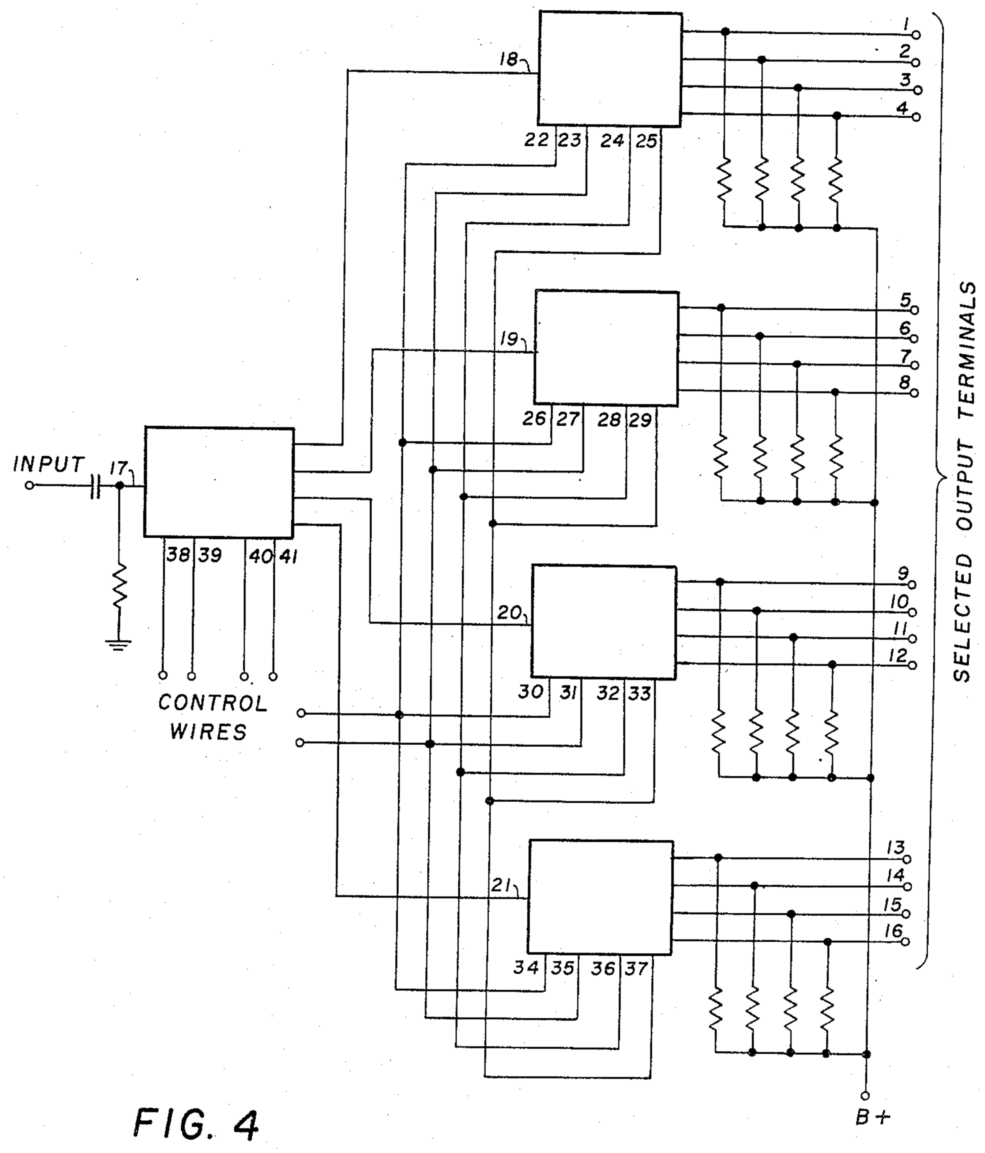

The foregoing as well as further objects and advantages of my present invention will become apparent from a reading of the following specification taken in connection with the drawings in which Fig. 1 is a perspective view of an assembled matrix and cover; Fig. 2 is an elevational side view with one of the end plates removed, the view being taken along the line 2—2, of Fig. 1; Fig. 3 is a schematic diagram of the network illustrated in Figs. 1 and 2; and Fig. 4 is a schematic diagram, partly in block form, of the combination of a plurality of plug-in units made in accordance with the principles of my invention arranged to provide a sixteen terminal output.

Referring to the drawings, there is shown a plurality of rectifiers *1a*, *1b*, . . . *6a*, *6b*, which may be crystal diodes of the type known as 1N34–A, for example.

Means is provided for suitably mounting the diodes *1a* . . . *6b* comprising a pair of terminal strips or panels 11 and 12 disposed in spaced-apart relationship as by means of spacing members 13 at either end of strips 11 and 12. The foregoing parts may be held in assembled relationship by suitable fastening means such as bolts 14 extending through suitable openings in strips 11 and 12 and spacing members 13 and suitable nuts 15.

There are provided end plates 16 and 17 extending beyond strips 11 and 12 and secured in position by suitable fastening means such as screws 18 which extend through suitable openings in the end plates into suitably threaded bores 18*a* in the ends of spacers 13.

Means is provided for removably mounting diodes *1a*, *2a*, *3a*, *4a*, *5a* and *6a* ("*a*" diodes) on the outwardly disposed face of strip 11 and for mounting diodes *1b*, *2b*, *3b*, *4b*, *5b* and *6b* (the "*b*" diodes) on the outer face of strip 12. For this purpose, end members or plates 16 and 17 are notched or otherwise provided with corresponding recesses 19 along opposite edges of the end plates 16 and 17, each pair of recesses supporting one of said rectifier elements, the terminals of said rectifier elements extending into said recesses.

In order to maintain rectifier terminals in said recesses, means is provided for pressing the ends or terminals of each diode element backwardly and upwardly as seen in Figs. 1 and 2 into the upper rear corners of recesses 19. For this purpose there is provided a plurality of spring members 20 which are made of electrically conductive spring material so that spring members 20 serve not only to resiliently press the diodes into the operative positions but also serve as electrical terminals having electrical engagement with the terminals of the diodes. Each spring member or clip is formed as shown to insure retention of the diodes in place except when manually moved aside or when the rectifiers are gripped to enable their removal.

Springs 20 are preferably fastened in place, any suitable means such as rivets 21 being provided. As seen in Figs. 2 and 3, diodes *1a* and *1b*, *2a* and *2b*, etc., are connected back to back, and the inner ends of the rivets 21 are connected together by conductors 22 to 27, respectively. Conductor 22 thus connects the corresponding ends or terminals of diodes *1a* and *1b*, conductor 23 connects diodes *2a* and *2b*, etc. The remaining terminals of spring members 20 are interconnected within the space defined by strips 11 and 12 and end plates 16 and 17 by suitable conductors as shown in the drawings.

Means is provided for connecting the diodes in an external electric circuit. For this purpose there is provided a plug-in base 28 having a plurality of electrical contact making pins 29, the pins 29 being connected to predetermined points in the matrix.

In order to support plug 28 and to retain the plug in relatively fixed relationship with respect to the rest of the device, plug-in base 28 is retained within base member 30 which is suitably held between end plate 16 and 17 as by means of screws 31 extending through suitable openings into suitably tapped bores 32 in member 30. Set screws 33 may extend through the walls of base member 30 into engagement with the sides of base 28. Cover 34 completes the assembly.

In Fig. 3 there is shown a circuit diagram of a four path diode switch utilizing the 12 diodes shown in Figs. 1 and 2. As explained in both, the rectifiers are connected back to back by conductors 22 to 27, inclusive. Conductors 22, 23, 26 and 27 are connected to output terminals 1 to 4, respectively, the other terminal of diode *6b* is connected to a control terminal 5, the other terminal of diode *5b* is connected to control terminal 6, the other terminals of diodes *2b* and *4b* are connected to control terminal 7, and the other terminals of diodes *1b* and *3b* are connected to control terminal 8. The other terminals of diodes *1a* and *2a* are connected to conductor 24, the other terminals of diodes *5a* and *6a* are connected to input terminal 9, and the other terminals of diodes *3a* and *4a* are connected to conductor 25. Input terminal 9 may be connected to any suitable source of input signal. For example, a suitable source of signal 35 may be connected to terminal 9 through a coupling capacitor 36, input terminal 9 also being connected to ground through a suitable resistor 37.

The output leads 1 to 4, inclusive, are shown connected to a suitable source of positive potential as indicated by +150 through identical resistors R1, R2, R3 and R4. The "*b*" diodes are returned to double-throw switches S1 and S2, the settings of which allow predetermined biases of, for example, +75 and +105 volts, respectively, to be applied selectively to the control leads 5 to 8, respectively.

With this arrangement there will be current through the matrix from the 150 volt positive supply through resistors R1 to R4, inclusive, and through the "*a*" diodes to a 75 volt point through the "$b$" diodes. Since the diode represents a virtual short in the forward direction, the voltage of that particular output lead will be 75 volts. All other "$b$" diodes tied to that path are biased at 105 volts and are therefore cut off. If, however, no path to a 75 volt point is available, there results a flow of current through the "$a$" diodes and finally through resistor 37 to ground. The ratio of each output resistor to resistor 37 is such that the voltage across resistor 37 and therefore at a particular output lead is approximately 90 volts.

It will be understood by those skilled in the art that other circuit arrangements of each matrix unit shown in Figs. 1 or 2 are within the spirit of my invention. Moreover, a plurality of such units may be combined in a more complex circuit. For example, a 16 terminal matrix may be formed by suitably interconnecting five of the units shown in Figs. 1 and 2, i. e., one such unit controls four other units. Such a multiple network is shown in Fig. 4 wherein each rectangular block represents a unit of the types shown in Figs. 1 and 2. At each rectangle the numerals 17 to 21 indicate the various input terminals corresponding to terminal 9 of Fig. 3, the numerals 1 to 16, inclusive, represent the various output terminals, and the numerals 22 to 41, inclusive, indicate the various control leads. Still larger networks may be built in a similar manner.

The foregoing individual matrices or networks are easily tested because a larger number of diodes is not soldered in place and testing does not require unsoldering of individual diodes to enable them to be tested separately. With the arrangement described and claimed herein, for example, units of 12 diodes may be removed, the control leads connected to a two stage binary frequency divider and a suitable instrument such as an oscilloscope, for example, connected to each of the output terminals in succession. With such an arrangement the configuration of the waveform appearing on the oscilloscope indicates the condition of each diode.

While I have shown and described a particular embodiment of my invention, it will be obvious to those skilled in the art that changes and modifications may be made without departing from my invention in its broader aspects. For example, my invention is not limited to assemblies of diodes or rectifiers but may be used in connection with any type of electrical component, although preferably such components having spaced-apart electrical terminals. My invention is not limited to spaced-apart terminal strips but is also useful in any assembly wherein a plurality of supports or locating members is provided and means is provided, such as springs, for example, for urging the component against the supports or stops. Either the supports, or the urging means or both may be electrically conductive. I, therefore, aim in the appended claims to cover all such changes and modifications as fall within the true spirit and scope of my invention.

What I claim is:

1. A network assembly comprising a pair of spaced-apart terminal strips of electrically insulative material, means extending beyond said strips, said extending means having a plurality of corresponding recesses along opposite edges thereof, a plurality of electrical components, each of said components having a pair of electrical terminals extending into corresponding recesses, spring means for maintaining said components in said recesses, and means disposed between said strips for interconnecting said spring means and said components in an electrical circuit.

2. A network assembly comprising a pair of spaced-apart terminal strips of electrically insulative material, means extending beyond said strips, said extending means having a plurality of corresponding recesses along opposite edges thereof, a plurality of electrical components, each of said components having a pair of electrical terminals extending into corresponding recesses, a spring member of electrically conductive material for each component terminal, said spring members being carried by said strips, and means disposed between said strips for interconnecting said spring members and said components in an electrical circuit.

3. A rectifier network assembly comprising a base, a pair of spaced-apart terminal strips carried by said base, a plurality of rectifier elements, each of said elements having a pair of electrical terminals, a pair of end plates attached to said base and extending beyond said strips, said end plates having corresponding recesses along opposite edges thereof, each of said rectifier elements having a pair of electrical terminals extending into corresponding recesses, spring means on said strips engaging said terminals for holding said terminals in said recesses, said spring means also comprising electrical terminals, and means disposed between said terminal strips for electrically interconnecting said rectifier element terminals, thereby connecting said rectifier elements into a matrix.

4. A plug-in rectifier matrix comprising a plug-in base having a plurality of electrically conductive circuit-completing pins, a pair of spaced-apart terminal strips carried by said base, a plurality of rectifier elements having ends constituting terminals, a pair of end plates disposed at the ends of said strips and extending beyond said strips, said end plates having corresponding recesses along opposite edges thereof, one of said rectifier elements being disposed such that each pair of recesses supports one of said rectifier elements, said terminal portions of said rectifier elements extending into said recesses, spring means engaging said rectifier element terminals for holding said terminals in said recesses, said spring means also comprising electrical terminals for said rectifier elements, means disposed between said terminal strips for electrically interconnecting said spring means, thereby connecting said rectifier elements into a matrix, and means for connecting said electrically conductive pins to predetermined points in said matrix.

5. A plug-in rectifier matrix comprising a plug-in base having a plurality of electrically conductive circuit completing pins, a pair of spaced-apart terminal strips carried by said base, a plurality of rectifier elements having ends constituting terminals, a pair of end plates disposed at the ends of said strips and extending beyond said strips, said end plates having corresponding recesses along opposite edges thereof, one of said rectifier elements being disposed such that each pair of recesses supports one of said rectifier elements, said terminal portions of said rectifier elements extending into said recesses, spring means engaging said rectifier element terminals for holding said terminals in said recesses, said spring means also comprising electrical terminals for said rectifier elements, means disposed between said terminal strips for electrically interconnecting said spring means, thereby connecting said rectifier elements into a matrix, and means for connecting said electrically conductive pins to predetermined points in said matrix, an input terminal, a plurality of output terminals, and means for connecting said terminals to desired points of said interconnecting means.

6. A plug-in rectifier matrix comprising a plug-in base having a plurality of electrically conductive circuit completing pins, a pair of spaced-apart terminal strips carried by said base, a plurality of rectifier elements having ends constituting terminals, a pair of end plates disposed at the ends of said strips and extending beyond said strips, said end plates having corresponding recesses along opposite edges thereof, one of said rectifier elements being disposed such that each pair of recesses supports one of said rectifier elements, said terminal portions of said rectifier elements extending into said recesses, spring means engaging said rectifier element terminals for holding said terminals in said recesses, said spring means also comprising electrical terminals for said rectifier elements, means disposed between said terminal strips for electrically interconnecting said spring means, thereby connecting said rectifier elements into a matrix, and means for connecting said electrically conductive pins to predetermined points in said matrix, an input terminal, a plurality of output terminals, a plurality of control terminals, and means for connecting said terminals to desired points of said interconnecting means.

References Cited in the file of this patent

UNITED STATES PATENTS

| | | |
|---|---|---|
| 1,293,594 | Willey | Feb. 4, 1919 |
| 2,028,717 | Hayden | Jan. 21, 1936 |
| 2,321,358 | Bokovoy | June 8, 1943 |
| 2,336,588 | Bixby | Dec. 14, 1943 |
| 2,410,041 | Bokovoy | Oct. 29, 1946 |
| 2,440,308 | Storck | Apr. 27, 1948 |
| 2,579,141 | Eckert | Dec. 18, 1951 |